(12) United States Patent
Rudolf et al.

(10) Patent No.: US 8,204,450 B2
(45) Date of Patent: Jun. 19, 2012

(54) RELIABILITY DETECTION OF CHANNEL QUALITY INDICATOR (CQI) AND APPLICATION TO OUTER LOOP POWER CONTROL

(75) Inventors: Marian Rudolf, Montreal (CA); Stephen G. Dick, Nesconset, NY (US); James M. Miller, Verona, NJ (US)

(73) Assignee: InterDigital Technology Corporation, Wilmington, DE (US)

( * ) Notice: Subject to any disclaimer, the term of this patent is extended or adjusted under 35 U.S.C. 154(b) by 0 days.

(21) Appl. No.: 13/214,490

(22) Filed: Aug. 22, 2011

(65) Prior Publication Data

US 2011/0299447 A1 Dec. 8, 2011

Related U.S. Application Data

(63) Continuation of application No. 12/464,312, filed on May 12, 2009, now Pat. No. 8,010,053, which is a continuation of application No. 10/726,374, filed on Dec. 3, 2003, now Pat. No. 7,536,154.

(60) Provisional application No. 60/430,854, filed on Dec. 4, 2002, provisional application No. 60/438,560, filed on Jan. 6, 2003.

(51) Int. Cl.
*H04B 1/00* (2006.01)

(52) U.S. Cl. .................... 455/69; 455/562.1; 370/335

(58) Field of Classification Search .............. 455/69, 455/562.1, 561; 370/335, 342, 328, 329
See application file for complete search history.

(56) References Cited

U.S. PATENT DOCUMENTS

| | | | | |
|---|---|---|---|---|
| 4,893,248 A | * | 1/1990 | Pitts et al. ................ | 705/400 |
| 5,507,035 A | * | 4/1996 | Bantz et al. .............. | 455/133 |
| 5,570,343 A | * | 10/1996 | Bishop et al. ........... | 370/216 |
| 5,627,834 A | * | 5/1997 | Han et al. ................. | 370/241 |
| 5,642,377 A | | 6/1997 | Chung et al. | |
| 5,757,846 A | | 5/1998 | Vasudevan et al. | |
| 5,778,317 A | | 7/1998 | Kaminsky et al. | |
| 5,889,772 A | * | 3/1999 | Fischer et al. ........... | 370/346 |
| 6,122,265 A | | 9/2000 | Nakamura et al. | |
| 6,181,948 B1 | | 1/2001 | Kondo | |

(Continued)

FOREIGN PATENT DOCUMENTS

EP 1 128 578 8/2001

(Continued)

OTHER PUBLICATIONS

3GPP TS 25.214 v5.4.0 (Mar. 2003), 3$^{rd}$ Generation Partnership Project; Technical Support Group Radio Access Network; Physical Layer Procedures; (FDD) (Release 5).

(Continued)

*Primary Examiner* — Minh D Dao
(74) *Attorney, Agent, or Firm* — Volpe and Koenig, P.C.

(57) ABSTRACT

A method for determining a channel quality in wireless communications includes receiving a high speed shared control channel (HS-SICH) transmission. An expected number of HS-SICH transmissions and a number of unsuccessful HS-SICH transmissions are counted. The number of unsuccessful HS-SICH transmissions includes a number of failed HS-SICH transmissions and a number of missed HS-SICH transmissions. The expected number of HS-SICH transmissions and the number of unsuccessful HS-SICH transmissions over a fixed time period are periodically reported, whereby the reporting is an indication of the channel quality.

21 Claims, 5 Drawing Sheets

U.S. PATENT DOCUMENTS

| | | | |
|---|---|---|---|
| 6,185,432 B1 | 2/2001 | Vembu | |
| 6,384,648 B1 | 5/2002 | O'Toole et al. | |
| 6,396,867 B1 | 5/2002 | Tiedemann, Jr. et al. | |
| 6,442,157 B1 | 8/2002 | Carter et al. | |
| 6,577,617 B1 | 6/2003 | Ue et al. | |
| 6,671,512 B2 | 12/2003 | Laakso | |
| 6,850,771 B2* | 2/2005 | Malladi et al. | 455/522 |
| 7,103,325 B1* | 9/2006 | Jia et al. | 455/101 |
| 7,116,651 B2* | 10/2006 | Hakkinen et al. | 370/329 |
| 7,116,944 B2* | 10/2006 | Das et al. | 455/69 |
| 7,124,350 B2* | 10/2006 | Chao et al. | 714/776 |
| 7,133,688 B2* | 11/2006 | Das et al. | 455/522 |
| 7,170,876 B2* | 1/2007 | Wei et al. | 370/335 |
| 7,346,034 B2* | 3/2008 | Takano et al. | 370/331 |
| 2001/0040880 A1 | 11/2001 | Chen et al. | |
| 2002/0081977 A1 | 6/2002 | McCune, Jr. | |
| 2003/0039218 A1* | 2/2003 | Kwak | 370/320 |
| 2003/0064743 A1 | 4/2003 | Chen | |
| 2003/0095532 A1* | 5/2003 | Kim et al. | 370/342 |
| 2003/0119452 A1 | 6/2003 | Kim et al. | |
| 2003/0148738 A1* | 8/2003 | Das et al. | 455/67.5 |
| 2003/0148770 A1* | 8/2003 | Das et al. | 455/455 |
| 2003/0161285 A1 | 8/2003 | Tiedemann, Jr. | |
| 2003/0207687 A1* | 11/2003 | Svedevall et al. | 455/436 |
| 2003/0223396 A1* | 12/2003 | Tsai et al. | 370/342 |
| 2003/0235162 A1* | 12/2003 | Chao et al. | 370/329 |
| 2004/0116142 A1* | 6/2004 | Wang et al. | 455/522 |
| 2004/0219926 A1 | 11/2004 | Kim et al. | |
| 2004/0246895 A1 | 12/2004 | Feyerabend | |
| 2005/0174982 A1* | 8/2005 | Uehara et al. | 370/345 |
| 2005/0250540 A1* | 11/2005 | Ishii et al. | 455/561 |
| 2006/0057965 A1* | 3/2006 | Braun et al. | 455/67.11 |
| 2006/0059253 A1* | 3/2006 | Goodman et al. | 709/223 |
| 2006/0133402 A1* | 6/2006 | Dottling et al. | 370/431 |
| 2006/0285585 A1* | 12/2006 | Sampath | 375/227 |
| 2007/0097981 A1* | 5/2007 | Papasakellariou | 370/394 |
| 2008/0227449 A1* | 9/2008 | Gholmieh et al. | 455/434 |

FOREIGN PATENT DOCUMENTS

| | | |
|---|---|---|
| JP | 2001-245359 | 7/2001 |
| WO | 95/21494 | 8/1995 |
| WO | 99/18702 | 4/1999 |
| WO | 00/52874 | 9/2000 |
| WO | 02/43275 | 5/2002 |
| WO | 02/063795 | 8/2002 |
| WO | 02/075955 | 9/2002 |
| WO | 02/093951 | 11/2002 |
| WO | 03/019820 | 3/2003 |
| WO | 03/073644 | 9/2003 |
| WO | 03/087978 | 10/2003 |

OTHER PUBLICATIONS

3GPP TS 25.321 v5.4.0 (Mar. 2003), $3^{rd}$ Generation Partnership Project; Technical Support Group Radio Access Network; Medium Access Control (MAC) Protocol Specification (Release 5).

3GPP, "3rd Generation Partnership Project; Technical Specification Group Radio Access Network; UTRAN Iub interface NBAP signalling (Release 1999)," 3GPP TS 25.433 V3.14.0 (Sep. 2003).

3GPP, "3rd Generation Partnership Project; Technical Specification Group Radio Access Network; UTRAN Iub interface NBAP signalling (Release 4)," 3GPP TS 25.433 V4.6.0 (Sep. 2002).

3GPP, "3rd Generation Partnership Project; Technical Specification Group Radio Access Network; UTRAN Iub interface NBAP signalling (Release 4)," 3GPP TS 25.433 V4.10.0 (Sep. 2003).

3GPP, "3rd Generation Partnership Project; Technical Specification Group Radio Access Network; UTRAN Iub interface NBAP signalling (Release 5)," 3GPP TS 25.433 V5.2.0 (Sep. 2002).

3GPP, "3rd Generation Partnership Project; Technical Specification Group Radio Access Network; UTRAN Iub interface NBAP signalling (Release 5)," 3GPP TS 25.433 V5.6.0 (Sep. 2003).

3GPP, "3rd Generation Partnership Project; Technical Specification Group Radio Access Network; Physical layer—Measurements (TDD) (Release 1999)," 3GPP TS 25.225 V3.11.0 (Sep. 2002).

3GPP, "3rd Generation Partnership Project; Technical Specification Group Radio Access Network; Physical layer—Measurements (TDD) (Release 1999)," 3GPP TS 25.225 V3.12.0 (Jun. 2003).

3GPP, "3rd Generation Partnership Project; Technical Specification Group Radio Access Network; Physical layer—Measurements (TDD) (Release 4)," 3GPP TS 25.225 V4.5.0 (Sep. 2002).

3GPP, "3rd Generation Partnership Project; Technical Specification Group Radio Access Network; Physical layer—Measurements (TDD) (Release 4)," 3GPP TS 25.225 V4.7.0 (Jun. 2003).

3GPP, "3rd Generation Partnership Project; Technical Specification Group Radio Access Network; Physical layer—Measurements (TDD) (Release 5)," 3GPP TS 25.225 V5.2.0 (Sep. 2002).

3GPP, "3rd Generation Partnership Project; Technical Specification Group Radio Access Network; Physical layer—Measurements (TDD) (Release 5)," 3GPP TS 25.225 V5.5.0 (Jun. 2003).

3GPP, "$3^{rd}$ Generation Partnership Project; Technical Support Group Radio Access Network; MAC Protocol Specification (Release 1999)," 3GPP TS 25.321 v3.13.0 (Sep. 2002).

3GPP, "$3^{rd}$ Generation Partnership Project; Technical Support Group Radio Access Network; Medium Access Control (MAC) Protocol Specification (Release 1999)," 3GPP TS 25.321 v3.16.0 (Sep. 2003).

3GPP, "$3^{rd}$ Generation Partnership Project; Technical Support Group Radio Access Network; MAC Protocol Specification (Release 4)," 3GPP TS 25.321 v4.6.0 (Sep. 2002).

3GPP, "$3^{rd}$ Generation Partnership Project; Technical Support Group Radio Access Network; Medium Access Control (MAC) Protocol Specification (Release 4)," 3 GPP TS 25.321 v4.9.0 (Sep. 2003).

3GPP, "$3^{rd}$ Generation Partnership Project; Technical Support Group Radio Access Network; Physical Layer Procedures (FDD) (Release 1999)." 3GPP TS 25.214 v3.11.0 (Sep. 2002).

3GPP, "$3^{rd}$ Generation Partnership Project; Technical Support Group Radio Access Network; MAC Protocol Specification (Release 5)," 3GPP TS 25.321 v5.2.0 (Sep. 2002).

3GPP, "$3^{rd}$ Generation Partnership Project; Technical Support Group Radio Access Network; Medium Access Control (MAC) Protocol Specification (Release 5)," 3GPP TS 25.321 v5.6.0 (Sep. 2003).

3GPP, "$3^{rd}$ Generation Partnership Project; Technical Support Group Radio Access Network; Physical Layer Procedures (FDD) (Release 1999)." 3GPP TS 25.214 v3.12.0 (Mar. 2003).

3GPP, "$3^{rd}$ Generation Partnership Project; Technical Support Group Radio Access Network; Physical Layer Procedures (FDD) (Release 4)." 3GPP TS 25.214 v4.5.0 (Sep. 2002).

3GPP, "$3^{rd}$ Generation Partnership Project; Technical Support Group Radio Access Network; Physical Layer Procedures (FDD) (Release 4)." 3GPP TS 25.214 v4.6.0 (Mar. 2003).

3GPP, "$3^{rd}$ Generation Partnership Project; Technical Support Group Radio Access Network; Physical Layer Procedures (FDD) (Release 5)." 3GPP TS 25.214 v5.2.0 (Sep. 2002).

3GPP, "$3^{rd}$ Generation Partnership Project; Technical Support Group Radio Access Network; Physical Layer Procedures (FDD) (Release 5)." 3GPP TS 25.214 v5.6.0 (Sep. 2003).

3GPP, "$3^{rd}$ Generation Partnership Project; Technical Support Group Radio Access Network; Physical Channels and Mapping of Transport Channels onto Physical Channels (FDD) (Release 1999)," 3GPP TS 25.211 V3.12.0 (Sep. 2002).

3GPP, "$3^{rd}$ Generation Partnership Project; Technical Support Group Radio Access Network; Physical Channels and Mapping of Transport Channels onto Physical Channels (FDD) (Release 4)," 3GPP TS 25.211 V4.6.0 (Sep. 2002).

3GPP, "$3^{rd}$ Generation Partnership Project; Technical Support Group Radio Access Network; Physical Channels and Mapping of Transport Channels onto Physical Channels (FDD) (Release 5)," 3GPP TS 25.211 V5.2.0 (Sep. 2002).

3GPP, "$3^{rd}$ Generation Partnership Project; Technical Support Group Radio Access Network; Physical Channels and Mapping of Transport Channels onto Physical Channels (FDD) (Release 5)," 3GPP TS 25.211 V5.5.0 (Sep. 2003).

3GPP, "3rd Generation Partnership Project; Technical Support Group Radio Access Network; High Speed Downlink Packet Access (HSDPA); Overall Description; Stage 2 (Release 5)," 3GPP TS 25.308 V5.2.0 (Mar. 2002).

3GPP, "3rd Generation Partnership Project; Technical Support Group Radio Access Network; High Speed Downlink Packet Access (HSDPA); Overall Description; Stage 2 (Release 5)," 3GPP TS 25.308 V5.4.0 (Mar. 2003).

3GPP, "Technical Specification Group Radio Access Network; UTRAN Iub interface NBAP signalling (Release 1999)," 3GPP TS 25.433 V3.11.0 (Sep. 2002).

IP Wireless, "HS-SICH Power Control for HCR-TDD," 3GPP TSG-RAN WG1 #29, R1-02-1347 (Nov. 5-8, 2002).

SIEMENS AG, "Editorial modification to the section numberings," 3GPP TSG-RAN1 Meeting #29, R1-02-1390 (Nov. 5-8, 2002).

* cited by examiner

RELIABILITY DETECTION OF CHANNEL QUALITY INDICATOR (CQI) AND APPLICATION TO OUTER LOOP POWER CONTROL

CROSS REFERENCE TO RELATED APPLICATIONS

This application is a continuation of U.S. patent application Ser. No. 12/464,312, filed May 12, 2009, now U.S. Pat. No. 8,010,053, issuing Aug. 30, 2011, which is a continuation of U.S. patent application Ser. No. 10/726,374, filed Dec. 3, 2003, now U.S. Pat. No. 7,536,154, issued May 19, 2009, which claims priority from U.S. Provisional Patent Application No. 60/430,854, filed on Dec. 4, 2002, and from U.S. Provisional Patent Application No. 60/438,560, filed on Jan. 6, 2003, which are incorporated by reference as if fully set forth herein.

FIELD OF INVENTION

The present invention relates generally to channel quality measurements in wireless communications, and more particularly, to a method and apparatus for reliably detecting channel quality and its application to outer power loop control.

BACKGROUND

Currently, third generation (3G) mobile communication systems are being standardized to implement efficient and high throughput of downlink (DL) packet data transfer mechanisms. In the context of universal mobile telecommunications system (UMTS) wideband code-division multiple access (W-CDMA) based 3G systems, these packet transfer techniques are commonly referred to as high-speed downlink packet access (HSDPA). HSDPA is possible for both Frequency Division Duplex (FDD) and Time Division Duplex (TDD) modes, and is implemented for chip rates of 1.28 Mcps and 3.84 Mcps.

The following characteristic features are the source of recognized efficiency and achievable data throughput of HSDPA: Adaptive Modulation and Coding (AMC) techniques; fast Hybrid Automatic Repeat Request (Hybrid ARQ); fast feedback mechanism for uplink (UL) reporting of instantaneous DL channel quality; and radio resource efficient packet scheduling mechanism and fast, short-term DL channel assignments.

Yet another distinguishing feature of HSDPA is that the data rate and amount of DL transmission (Tx) power that an HSDPA base station allocates to a wireless transmit and receive unit (WTRU) is a function of the WTRU's instantaneous channel conditions. For example, a user close to the base station can reliably receive a high HSDPA data rate with low transmission power. A user far away from the base station, or a user confronted with unfavorable channel conditions, would only support a reduced data rate for the same or higher amount of allocated DL transmission power.

The instantaneous HSDPA data rate that a particular user can reliably support is generally dependent on: 1) path loss, which is based on the distance to the serving base station; 2) shadowing; 3) instantaneous fast fading conditions; 4) interference at the user's receiver caused by other users present in the system; and 5) the user's channel conditions, such as the speed and propagation environment. In other words, the HSDPA data rate is a function of the user's experienced DL signal-to-interference ratio (SIR) which is based upon all of these factors and is representative of the DL data rate that the user can support. The user's DL SIR will generally vary in time as a function of these factors.

Knowledge of the user's experienced DL SIR or any similar representative metric with this functionality, for example BLER, BER, or received signal power combined with received DL interference, is essential for the HSDPA base station to ensure highly efficient HSDPA operation. CDMA systems employing HSDPA have therefore adopted a fast UL Layer 1 (L1) signaling mechanism which allows a WTRU to periodically report the DL SIR to the base station with a fast, UL channel quality indicator (CQI). The current FDD specification allows configuration of the periodic CQI feedback in the UL to be sent every 0 (when CQI reporting is turned off), 2, 4, 8, 10, 20, 40, 80, or 160 ms. However, in TDD there is no periodic CQI feedback, so the CQI is instead sent with an ACK/NACK on the High-Speed Shared Control Channel (HS-SICH) whenever a DL data block on the HSDPA Data Channel (HS-DSCH) is received by a WTRU. In W-CDMA FDD and TDD modes, this mechanism is commonly referred to as CQI reporting.

The method for measuring a CQI in a particular WTRU implementation is not standardized, but is open to vendor implementation. But the method of how to derive the reported CQI value is standardized. In the FDD standard, there is a table (as shown in 3GPP TS 25.321, Medium Access Control (MAC) Protocol Specification, 5.4.0 (2003-03)) listing some 30 CQI values roughly corresponding to increasingly higher data rates, and therefore proportional to higher and higher DL SIRs. The reported CQI in FDD is derived as follows (per 3GPP TS 25.214, Physical layer procedures (FDD), v5.4.0 (2003-03), section 6A.2): "the UE shall report the highest tabulated CQI value for which a single HS-DSCH sub-frame formatted with the transport block size, number of HS-PDSCH codes and modulation corresponding to the reported or lower CQI value could be received in a 3-slot reference period ending 1 slot before the start of the first slot in which the reported CQI value is transmitted and for which the transport block error probability would not exceed 0.1." In TDD, the reporting is different; the transport block size is reported if it was transmitted during the last received transmission interval (the number of timeslots where the last HS-DSCH was received) and that transmission would have yielded a block error rate of 0.1.

As an example, in the current W-CDMA FDD release 5, the CQI is an information bit sequence five bits long which is encoded by means of a (20, 5) Reed-Muller code. The resulting 20 bit long coded sequence is sent in the UL on a High-Speed Dedicated Physical Control Channel (HS-DPCCH). Every user has a separate HS-DPCCH with an adjustable CQI reporting cycle (feedback rate). A user can report the CQI on the HS-DPCCH even if the user does not receive data on the HS-DSCH.

As another example, in the current W-CDMA TDD release (3.84 Mcps or high chip rate (HCR) TDD), the CQI is an information bit sequence ten bits long which is encoded by means of a (32, 10) Reed-Muller code. The resulting 32 bit long coded sequence is sent in the UL as part of the HS-SICH. With current TDD, a CQI transmission can only take place if the user has previously received data on the HS-DSCH in the frame.

Because the reliability of a WTRU's CQI report has an impact on HSDPA operation, it is important that an HSDPA base station has a means of determining whether a CQI was received in error. By discarding any erroneously received CQI, the HSDPA base station can avoid the situation in which it would choose a DL data rate and corresponding transmission power for a user that is not adapted to the user's experienced DL channel conditions. Erroneous CQIs reduce the HSDPA data throughput to the user and create a high level of interference to the other users in the system, which reduces the efficiency of HSDPA service in the W-CDMA system.

Furthermore, too many CQIs received in error from a particular user are an indication that the user's UL transmission power settings are not accurate and the base station or another access network node, such as the Radio Network Controller (RNC), will take appropriate actions. As an example, the RNC can signal a higher target UL SIR to the user in order to increase its UL transmission power and to lower the error rate on HS-DPCCH (in FDD) or HS-SICH (in TDD). This type of RNC functionality is commonly referred to as outer loop power control.

Error detection of received UL transmissions in W-CDMA FDD and TDD modes is typically accomplished by employing a Cyclic Redundancy Check (CRC), i.e., a bit sequence computed from and accompanying the data which, when decoded in error in the base station, is a reliable indicator of decoding errors. For a CRC to be effective in error detection, the length of the CRC must be sufficiently large. However, in order to avoid having an inefficient process, the ratio of the CRC length to the actual data length must be small. In a typical application, the data may be on the order of hundreds of bits while the CRC field may be on the order of 8-24 bits.

Unfortunately, the HS-DPCCH (FDD) and the HS-SICH (TDD) are fast L1 UL signaling channels which do not include any UL data or a sufficient number of L1 signaling bits to make efficient use of a CRC. To provide sufficient error detection capabilities, the CRC would have to be nominally at least the same size as the data field that it is verifying. With these considerations, current HSDPA standards do not use a CRC on the HS-DPCCH (FDD) and the HS-SICH (TDD).

Therefore, based on existing techniques the network (base station or RNC) has no means of reliably determining whether or not a CQI was received in error or not. The network can only configure the WTRU to use a high enough UL transmission power by means of an UL target SIR and by "experience" from simulations, such that the event of errors is sufficiently unlikely and not detrimental to HSDPA system operation. It is therefore advantageous to provide a method for reliably detecting and reporting the correctness of received CQI values.

SUMMARY

The method disclosed herein enables the base station to determine the degree of reliability of the CQI. The method also provides a useful reliability detection mechanism for a CQI report received by the HSDPA base station from a WTRU and provides a received CQI quality reporting mechanism from the HSDPA base station to the RNC in order to track and adjust a WTRU's UL transmitting power setting.

A method for determining a channel quality in wireless communications includes receiving a HS-SICH transmission. An expected number of HS-SICH transmissions and a number of unsuccessful HS-SICH transmissions are counted. The number of unsuccessful HS-SICH transmissions includes a number of failed HS-SICH transmissions and a number of missed HS-SICH transmissions. The expected number of HS-SICH transmissions and the number of unsuccessful HS-SICH transmissions over a fixed time period are periodically reported, whereby the reporting is an indication of the channel quality. A base station may be configured to perform the method, utilizing a receiver, one or more counters, and a reporting device.

BRIEF DESCRIPTION OF THE DRAWINGS

A more detailed understanding of the invention may be had from the following description of preferred embodiments, given by way of example and to be understood with reference to the accompanying drawings, in which.

DETAILED DESCRIPTION

As used and described hereafter, a WTRU includes, but is not limited to, a user equipment, a mobile station, a fixed or mobile subscriber unit, a pager, or any other type of device capable of operating in a wireless environment. When referred to hereafter, a base station includes, but is not limited to, a Node B, a site controller, an access point, or other type of interfacing device in a wireless environment.

Figure 1:
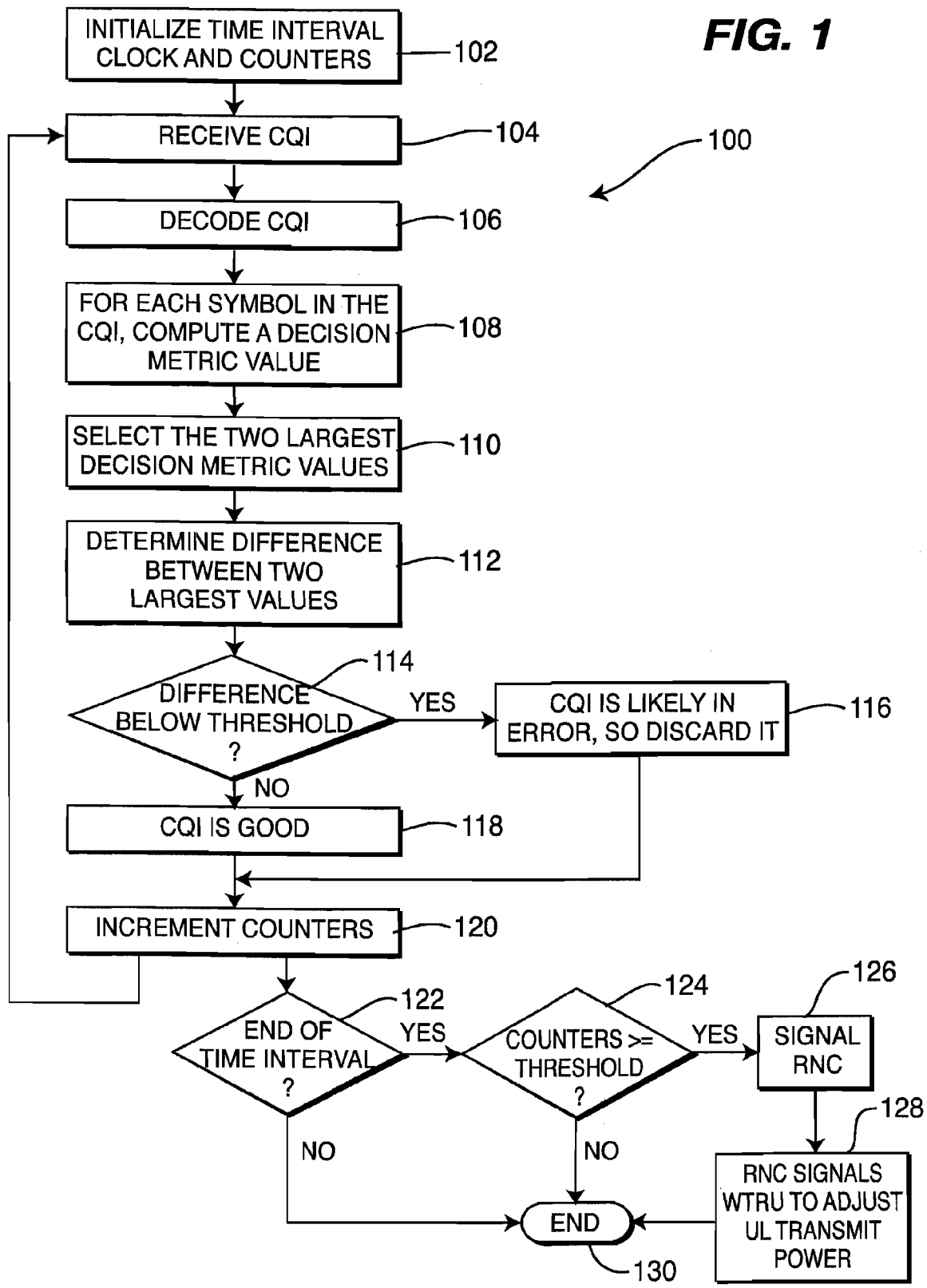
FIG. 1 is a flowchart of a method, applicable to both FDD and TDD.

FIG. 1 illustrates a method 100 for determining the reliability of a CQI and its application to outer loop power control. The method 100 begins by initializing a time interval clock and several counters, such as total HS-SICHs received, number of false HS-SICHs received, and number of HS-SICHs that have been missed (step 102). The CQI is received (step 104) and decoded (step 106). For each symbol in the CQI, a decision metric value is computed (step 108). The two largest decision metric values are selected (step 110) and the difference between the two largest values is determined (step 112). The difference between the two largest decision metrics is evaluated to determine if it is below a threshold (step 114). If the difference is below the threshold, then the CQI is likely to be in error, so it is discarded (step 116).

If the difference meets or exceeds the threshold, then the CQI is presumed to be valid (step 118). Next, the counters are incremented (step 120) and a determination is made whether the end of the time interval has been reached (step 122). Also, flow passes back to step 104; the loop of steps 104-120 repeats continuously, regardless of the value of the counters or whether the time interval has expired.

If the time interval has expired (step 122), then a determination is made whether the counters meet or exceed a threshold value (step 124). If the counters are equal to or greater than the threshold, the RNC is signaled (step 126), the RNC then signals the WTRU to adjust the UL transmission power (step 128), and the method ends (step 130). If the end of the time interval has not been reached (step 122) or if the counters are below the threshold (step 124), then the method ends (step 130).

It is noted that the difference determined in step 112 is applicable when the metric are logarithmic, i.e., in dB. If the metrics are in pure numbers, then steps 112 and 114 can be modified as follows. The ratio of the largest decision metric to the second largest decision metric is calculated (step 112) and the ratio is compared to the threshold (step 114).

A similar alternate method involving additional Iub signaling entails simple periodic reporting of the total number of HS-SICHs received, the number of false HS-SICHs received, and the number of HS-SICHs that have been missed over a fixed time period and reporting these numbers without regard to error thresholds. This type of periodic reporting would add more Iub signaling, but would be less complex to implement in the Node B.

Figure 2:
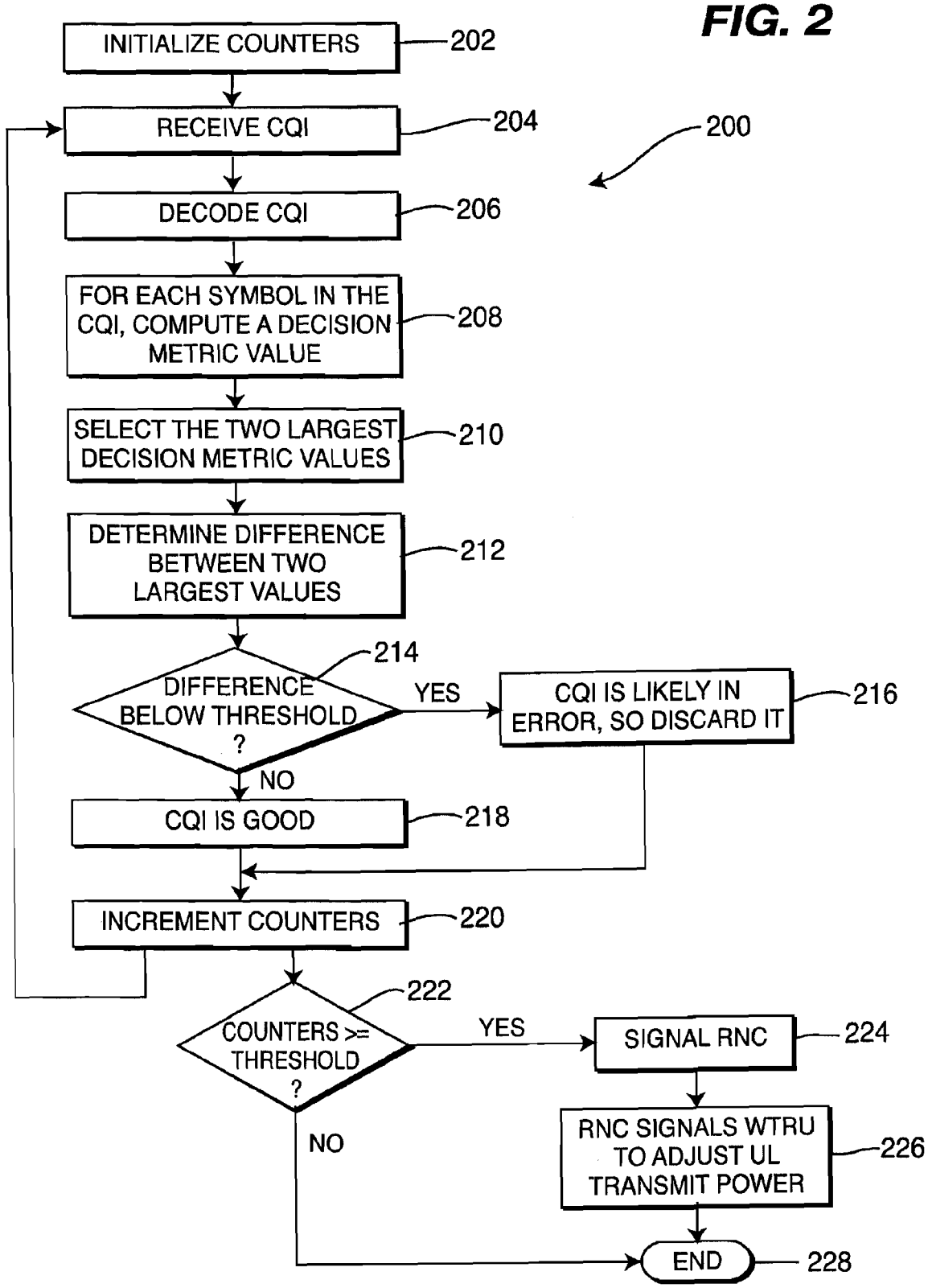
FIG. 2 is a flowchart of an alternate embodiment of a method, applicable to both FDD and TDD.

FIG. 2 shows an alternate method 200 for determining the reliability of a CQI and its application to outer loop power control. The method 200 begins by initializing several counters, such as total HS-SICHs received, number of false HS-SICHs received, and number of HS-SICHs that have been missed (step 202). The CQI is received (step 204) and decoded (step 206). For each symbol in the CQI, a decision metric value is computed (step 208). The two largest decision metric values are selected (step 210) and the difference between the two largest values is determined (step 212). The difference between the two largest decision metrics is evaluated to determine if it is below a threshold (step 214). If the difference is below the threshold, then the CQI is likely to be in error, so it is discarded (step 216).

If the difference is above the threshold, then the CQI is presumed to be valid (step 218). Next, the counters are incremented (step 220) and a determination is made whether the counters meet or exceed a threshold value (step 222). Also, flow passes back to step 204; the loop of steps 204-220 repeats continuously, regardless of the value of the counters.

If the counters are equal to or greater than the threshold, the RNC is signaled (step 224), the RNC then signals the WTRU to adjust the UL transmission power (step 226), and the method ends (step 228). If the counters are below the threshold (step 222), then the method ends (step 228).

When the base station decodes the received 32 bit code word (steps 106, 206), the output of the decoding process can be viewed as one of N distinct hypotheses, where the number of information bits n is related to M by $M=2^n$ (in TDD, n=10). In other words, one out of M symbols is sent from the WTRU to base station. The hypothesis test at the base station selects the most likely member of the M symbol alphabet, and then converts it back into the n information bits that the symbol, i.e., the encoded code word, represents.

Figure 3:
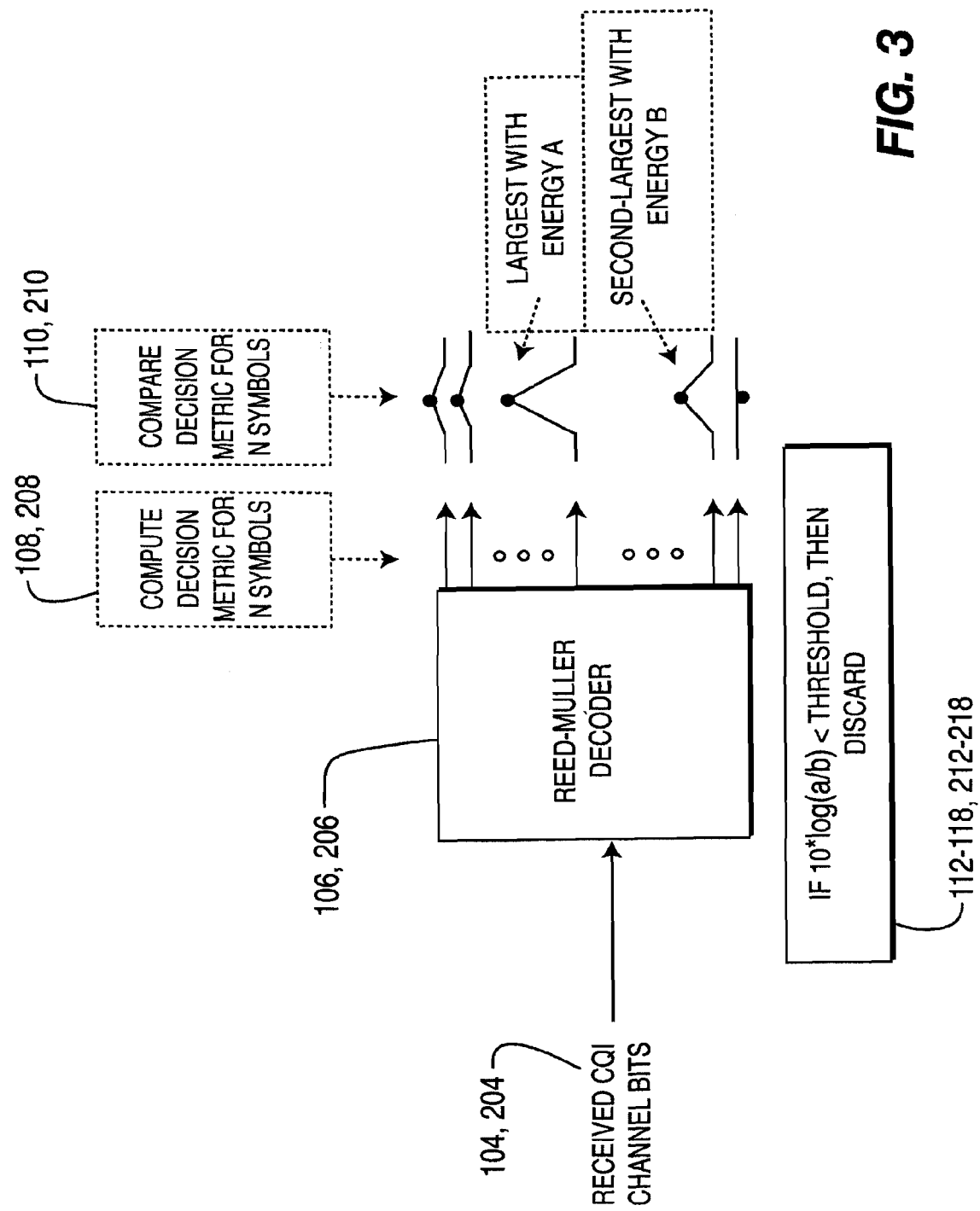
FIG. 3 shows an example of CQI reliability detection, applicable to both FDD and TDD.

Different decision algorithms exist to determine what represents the most likely received symbol, often varying on what is known about the symbols. For example, if it is more likely that a particular symbol is sent, then incorporating this knowledge into the decision algorithm provides an advantage over an algorithm which supposes that all symbols are sent equally often. To further illustrate, in the FDD context, the decoder can operate like 32 matched filters, with one filter for each symbol, wherein each symbol has a particular waveform (chip/bit sequence). Each matched filter correlates the received waveform with the waveform corresponding to a particular symbol. The correlation outputs from each of the 32 matched filters are basically a peak corresponding to energy. A large peak means that "very likely this was the symbol sent" (wherein a code word is equivalent to a chip sequence), and a small correlation peak means that "unlikely this was the right symbol." Then, the largest peak out of the 32 obtained peaks is selected and is determined to be the symbol that was sent. Because this is a statistical hypothesis test, on average the determined symbol is the best decision that can be made. An example of this process is shown in FIG. 3. The decoding process in the base station converts a sequence of received channel bits into soft decision metrics for every possible one out of M CQI symbols. The CQI quality detector can be implemented in a single integrated circuit or as discrete components.

In general, the information bit sequence (the CQI word) is n bits long. The CQI word is encoded to a (N,n) Reed-Muller code, which consists of M ($=2^n$) N-bit long encoded bit sequences. For example, in TDD, there are n=10 information bits, which results in 1024 ($M=2^{10}$) possible encoded words of length N=32 bits each. The process of encoding the CQI on the HS-SICH provides some repetition, which maps each of the N coded bits into N*4=L channel bits. Every channel bit is spread by a spreading factor of 16 (i.e., a 16 chip long spreading sequence), resulting in L*16=C chips. In TDD, the CQI word is generally encoded using a (32,10) Reed-Muller encoding and n=10, N=32, L=128, C=2048. Without loss of generality, the same principle of the method is also valid for FDD with a (16,5) encoding.

As those of skill in the art would realize, any other type of encoding scheme may be used, and the method is not limited to the schemes set forth herein. An arbitrary (N,n) encoding scheme as known by channel coding theory and existing for the choice of parameters n and N, determining its ratio of information bits to coded channel bits would operate with the method. For example, a Reed-Muller first or second order code or a Reed-Solomon code could be used. The particular coding scheme on the (N,n) bits is not significant, as long as the decoder can compute discrete decision metrics for each and every symbol that can be sent over the channel.

Steps 110 and 112 of FIG. 1 and steps 210 and 212 of FIG. 2 represent one possible method to determine CQI reliability. Numerous other methods for determining CQI reliability are possible. For example, the ratio of the greatest or largest decision-metric to the second greatest, or the difference between these two metrics in dB (10 log (ratio)) may be used. To illustrate by way of some simple equations, if $P_{max}$ denotes the value of the largest observed peak and $P_{second}$ denotes the second-largest observed peak, the ratio (R) could be expressed as $R=P_{max}/P_{second}$ or $\log(P_{max})/\log(P_{second})$ or more generally as $f(P_{max}/P_{second})$. Another proposed method of determining CQI reliability is the ratio of the energy of the greatest decision metric to the sum or a weighted sum of the energy of the set of M−1 other decision metrics. For example, $P_i$ (i=1 . . . 32) are values of the observed peaks at the output of the Reed-Muller decoder. $P_{max}$ is the maximum $P_i$ value. The measure R is expressed as $R=P_{max}/(\Sigma P_i - P_{max})$.

By comparing the soft decision metrics of the decoded CQI symbols, the base station can employ a simple threshold-based decision mechanism in order to decide whether the received CQI symbol is likely to be or not to be in error (steps 114, 214). As an example, if the difference between greatest and second greatest metric is less than 1 dB, there is a very high probability (typically, greater than 95%) that the CQI is in error and the CQI should be discarded. Other difference values may be used, with a corresponding reduced probability of the CQI being in error. A preferred range for the difference is between 0-2 dB, so that the probability of the CQI being in error is sufficiently high.

Figure 4:
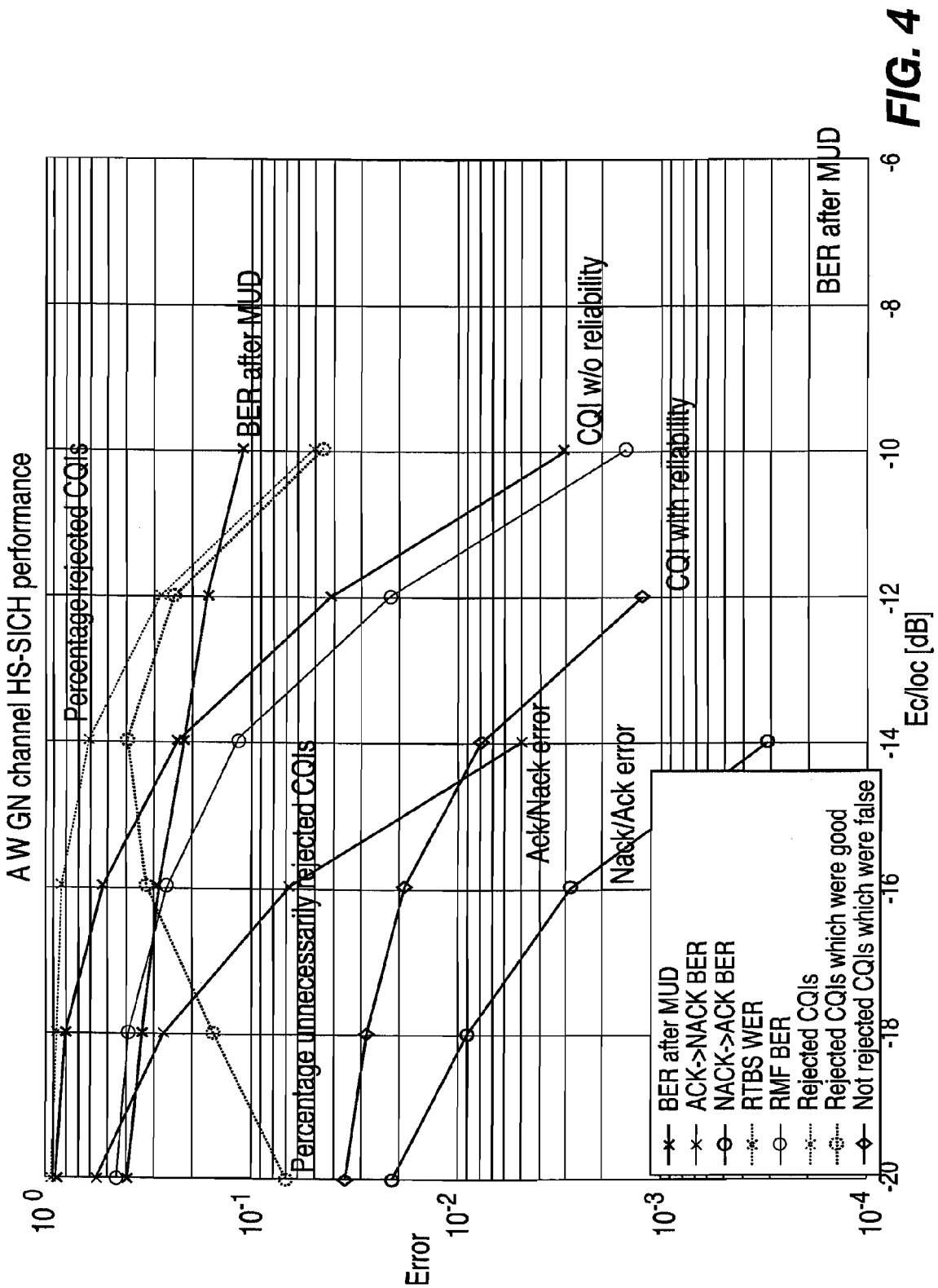
FIG. 4 is a graph of the additive white Gaussian noise (AWGN) channel HS-SICH performance, from TDD simulations.
Figure 5:
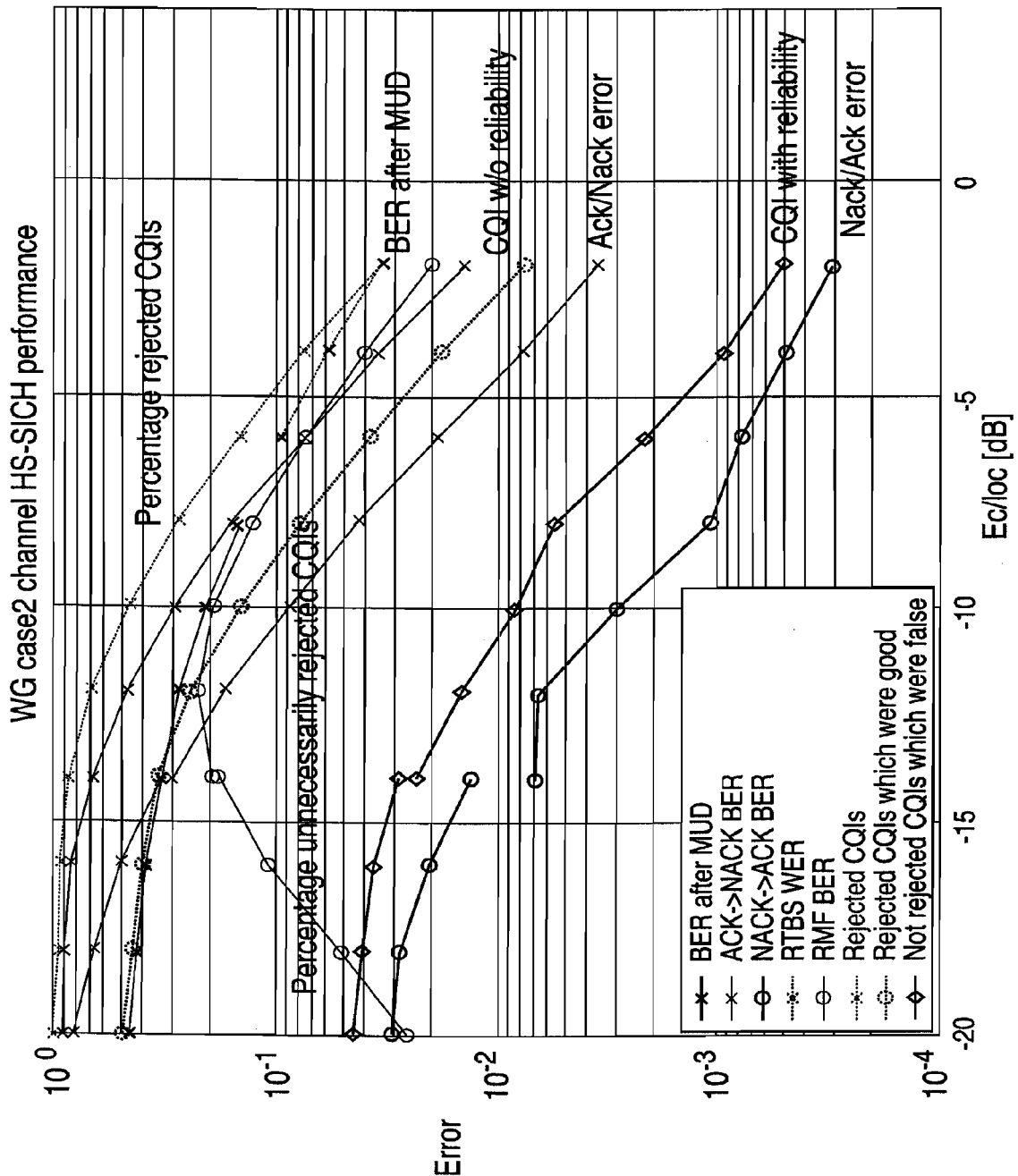
FIG. 5 is a graph of the WG4 test case 2 channel HS-SICH performance, from TDD simulations.

An example of the CQI reliability detection method performance in terms of the ability to detect CQI errors for the TDD case is shown in FIGS. 4 and 5. FIGS. 4 and 5 include graphs for BER after MUD, ACK→NACK BER, NACK→ACK BER, rejected CQIs, rejected CQIs which were good, and not rejected CQIs which were false. The graphs also include RMF BER, which is the first bit of the ten bit long CQI word and indicates the Recommended Modulation Format (either QPSK or QAM). The graphs show the BER for this single bit. The RTBS includes the other nine information bits in the CQI word and they denote the Recommended Transport Block Set, which is the number of information bits in the HS-DSCH transport block that the WTRU recommends should be sent. The graphs show the word error rate (WER) of these nine bits, which indicates the probability that at least one of the nine RTBS bits is in error.

The following observations may be made from FIGS. 4 and 5: 1) the ACK/NACK soft decision threshold is at 0.1*signal amplitude; 2) the criteria to reject a CQI includes the highest/second highest correlation peaks less than 1 dB away in amplitude; 3) erroneous CQIs can be readily detected; and 4) the ratio of "correct CQIs falsely rejected" to "wrong CQIs not rejected" can be easily scaled to meet target errors.

Thus, an improved CQI field coding is made possible by the use of the present method. Under previous methods, when the HS-SICH carrying the ACK/NACK and the CQI was received, there was no means of knowing if the received HS-SICH fields (either the ACK/NACK or the CQI) were received in error, because there was no CRC. If the ACK/NACK is received in error and the Node B does not realize this, the Node B could, for example, retransmit a packet that was already received successfully in the WTRU or discard (not retransmit) a packet which it should have retransmitted and WTRU waits for an extended period of time for a packet that will never arrive and memory stalls. The CQI reliability detection according to the present method allows the Node B to indicate which received HS-SICHs are reliable and can take appropriate actions, like retransmission. Also, in order to ensure reasonably often (<1% of the cases when received) that the HS-SICH is reliable, the HS-SICH needs to be received at a high SNR. This means that the WTRU must transmit at a higher power. Because the WTRU does not have much power and to be able to maximize coverage, the WTRU's transmission power must be sufficient to meet the average HS-SICH BER of 0.1. The proposed CQI reliability detection methods provide the Node B, via reporting the CQI, the means of tracking the current transmission power settings in the WTRU and the means to adjust the power settings.

Furthermore, the reliability detection method can also be used to provide indicators to the HSDPA base station and the RNC on HS-SICH/HS-DPCCH performance and CQI reporting, to alert the HSDPA base station that the CQI value may be in error. It is also possible to alert, through a message from the HSDPA base station to the RNC via the Iub/Iur network interfaces, that the delivered SIR may be inadequate. Simple statistics are provided, such as how many received HS-SICHs received from a particular WTRU were declared in error based on CQI metrics, how many total HS-SICHs were received over the same time period, and how many HS-SICHs were declared not to have been sent at all. These are functions that would normally be provided by a CRC and which now are possible due to the CQI reliability test based on soft decision metrics.

According to a particular aspect of the method, new messages are added to the Iub/Iur network interface to define occurrences of the number of failures of a transmission and the number or occurrences of symptom-free receptions, i.e., to report that a given WTRU has sent X successive UL HS-SICH messages without a failure being reported.

Upon reception of a predetermined number of CQI failure indicators related to a particular WTRU or HS-SICH channel, either the HSDPA base station or the RNC can take appropriate actions, such as changing the power control parameters for the WTRU or the HS-SICH channel, or discarding CQIs and using previous CQI reports for DL HSDPA transmissions. In one embodiment (shown in FIG. 1), counts are taken over 200 ms time intervals. In each frame (which is 10 ms long), there can be at most one HS-SICH received from a WTRU, so therefore there are at most 20 HS-SICHs in 200 ms. All counters are defined from 0 . . . 20 (total received HS-SICHs, false HS-SICHs, and missed HS-SICHs).

Even though the examples given above are directed to HSDPA TDD, the method is equally applicable to HSDPA FDD and other modes of transmission, for obtaining improved CQI reliability detection and improved outer loop power control. While specific embodiments have been shown and described, many modifications and variations could be made by one skilled in the art without departing from the scope of the invention. The above description serves to illustrate and not limit the particular invention in any way.

What is claimed is:

1. A method for performing outer loop power control in wireless communications, including:
   receiving a channel quality indicator (CQI) message;
   decoding the CQI message;
   computing a decision metric value for each symbol in the CQI message;
   determining whether the CQI message is erroneous;
   counting a number of erroneous CQI messages; and
   signaling a wireless/transmit receive unit to adjust an uplink transmission power on a condition that the number of erroneous CQI messages exceeds a threshold.

2. The method according to claim 1, wherein the determining includes:
   selecting a largest decision metric value;
   selecting a second largest decision metric value;
   comparing the largest decision metric value and the second largest decision metric value against a threshold, wherein the CQI message is erroneous on a condition that the comparison result is below the threshold.

3. The method according to claim 2, wherein the decision metric values are logarithmic and the comparing includes determining a difference between the largest decision metric value and the second largest decision metric value.

4. The method according to claim 2, wherein the comparing includes calculating a ratio of the largest decision metric value to the second largest decision metric value.

5. The method according to claim 1, wherein the counting includes using at least one counter.

6. The method according to claim 1, wherein the counting includes counting a total number of high-speed shared control channels (HS-SICHs) received, a number of false HS-SICHs received, and a number of HS-SICHs that have been missed.

7. The method according to claim 1, wherein:
   the counting is performed over a time interval; and
   the signaling is performed after expiration of the time interval.

8. The method according to claim 1, wherein the method is performed by a radio network controller and the CQI message is received from a wireless transmit/receive unit.

9. The method according to claim 1, wherein the method is performed by a base station and the CQI message is received from a wireless transmit/receive unit.

10. A base station configured to perform outer loop power control, including:
    a receiver configured to receive a channel quality indicator (CQI) message;
    a decoder configured to decode the CQI message;
    a processor configured to:
       compute a decision metric value for each symbol in the CQI message; and
       determine whether the CQI message is erroneous;
    a counter configured to count a number of erroneous CQI messages; and a transmitter configured to signal a wireless/transmit receive unit to adjust an uplink transmission power on a condition that the number of erroneous CQI messages exceeds a threshold.

11. The base station according to claim 10, wherein the processor is further configured to:
select a largest decision metric value;
select a second largest decision metric value;
compare the largest decision metric value and the second largest decision metric value against a threshold, wherein the CQI message is determined to be erroneous on a condition that the comparison result is below the threshold.

12. The base station according to claim 11, wherein the decision metric values are logarithmic and the processor is configured to determine a difference between the largest decision metric value and the second largest decision metric value.

13. The base station according to claim 11, wherein the processor is configured to calculate a ratio of the largest decision metric value to the second largest decision metric value.

14. The base station according to claim 10, wherein the counter is configured to count a total number of high-speed shared control channels (HS-SICHs) received, a number of false HS-SICHs received, and a number of HS-SICHs that have been missed.

15. The base station according to claim 10, wherein:
the counter is configured to count the number of erroneous CQI messages over a time interval; and
the transmitter is configured to signal the wireless transmit/receive unit after expiration of the time interval.

16. A radio network controller configured to perform outer loop power control, comprising:
a receiver configured to receive a channel quality indicator (CQI) message;
a decoder configured to decode the CQI message;
a processor configured to:
compute a decision metric value for each symbol in the CQI message; and
determine whether the CQI message is erroneous;
a counter configured to count a number of erroneous CQI messages; and
a transmitter configured to signal a wireless/transmit receive unit to adjust an uplink transmission power on a condition that the number of erroneous CQI messages exceeds a threshold.

17. The radio network controller according to claim 16, wherein the processor is further configured to:
select a largest decision metric value;
select a second largest decision metric value;
compare the largest decision metric value and the second largest decision metric value against a threshold, wherein the CQI message is determined to be erroneous on a condition that the comparison result is below the threshold.

18. The radio network controller according to claim 17, wherein the decision metric values are logarithmic and the processor is configured to determine a difference between the largest decision metric value and the second largest decision metric value.

19. The radio network controller according to claim 17, wherein the processor is configured to calculate a ratio of the largest decision metric value to the second largest decision metric value.

20. The radio network controller according to claim 16, wherein the counter is configured to count a total number of high-speed shared control channels (HS-SICHs) received, a number of false HS-SICHs received, and a number of HS-SICHs that have been missed.

21. The radio network controller according to claim 16, wherein:
the counter is configured to count the number of erroneous CQI messages over a time interval; and
the transmitter is configured to signal the wireless transmit/receive unit after expiration of the time interval.

* * * * *